United States Patent
Linden

(10) Patent No.: US 6,266,604 B1
(45) Date of Patent: Jul. 24, 2001

(54) METHOD FOR CRUISE CONTROL FOR A MOTOR VEHICLE

(75) Inventor: Thomas Linden, Stuttgart (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/458,522

(22) Filed: Dec. 13, 1999

(30) Foreign Application Priority Data

Dec. 17, 1998 (DE) ............................................. 198 58 294

(51) Int. Cl.$^7$ ................................................. B60K 31/00
(52) U.S. Cl. .............................. 701/93; 701/79; 180/197
(58) Field of Search ................... 701/93, 94, 79, 701/53; 180/197

(56) References Cited

U.S. PATENT DOCUMENTS

| | | |
|---|---|---|
| 1,307,038 | 6/1919 | Bruce . |
| 1,307,039 | 6/1919 | Casler . |
| 4,736,813 * | 4/1988 | Hayama et al. ................. 180/177 |
| 4,835,696 * | 5/1989 | Suzuki et al. ..................... 701/93 |
| 5,329,455 * | 7/1994 | Oo et al. .......................... 701/93 |
| 5,394,954 * | 3/1995 | Tashiro et al. .................. 180/178 |
| 5,541,843 * | 7/1996 | Yamaguchi et al. .............. 701/93 |
| 5,663,880 * | 9/1997 | Saur et al. ........................ 701/93 |
| 5,665,026 * | 9/1997 | Linden .......................... 477/108 |
| 5,774,820 * | 6/1998 | Linden et al. ................... 701/93 |

FOREIGN PATENT DOCUMENTS

| | | |
|---|---|---|
| 4443219C1 | 6/1996 | (DE) . |
| 69208092T | 6/1996 | (DE) . |
| 19508492A | 9/1996 | (DE) . |
| 19547716A | 6/1997 | (DE) . |

* cited by examiner

Primary Examiner—Tan Nguyen
(74) Attorney, Agent, or Firm—Mark P. Calcaterra

(57) ABSTRACT

A method for cruise control in which actual speed is changed by acceleration regulation in the direction of a predetermined set speed, as long as it is outside a speed regulation interval, and the speed is regulated by speed regulation to the set speed as long as the sped is within the speed regulation interval, changes from acceleration regulation to speed regulation by using a determined roadway gradient characteristic in conjunction with a speed control parameter set matched to the roadway gradient.

11 Claims, 2 Drawing Sheets

METHOD FOR CRUISE CONTROL FOR A MOTOR VEHICLE

The invention relates to a method for cruise control for a motor vehicle.

Such a method is known, for example, from Patent Specification DE 44 43 219 C1. Laid-Open Specification DE 195 08 492 A1, for example, also describes such a method. In the case of these cruise control methods, the actual speed is varied, as long as it is still relatively far away from the set speed, by acceleration regulation in the direction of the set speed, which can be predetermined. If it has then reached a speed regulation interval which can be predetermined and includes the set speed, it is regulated at the set speed by speed regulation. This can be achieved, for example, by a cruise control device which has an acceleration control loop and a speed control loop in parallel, between which it is possible to switch as appropriate. The acceleration control loop is used primarily for changing to the set speed which, depending on the situation, may also be a maximum speed, while the speed control loop is used primarily for driving at a steady speed.

By using the acceleration control loop, the actual speed can be varied smoothly in the direction of the set speed, when it is still relatively far away from the set speed. The changeover to speed regulation in good time before reaching the set speed allows the actual speed to approach the set speed optimally, without any noticeable overshoot effects.

A plurality of different control parameter sets, which depend on the gears selected in the motor vehicle transmission system are in each case available for acceleration regulation and speed regulation, which are switched between when gear changes are carried out. These control parameter sets are normally matched to steady-state driving, which is related to driving on level ground. The changeover from acceleration regulation to speed regulation is made when the actual speed enters the predetermined speed regulation interval, that is to say when the magnitude of the difference between the actual and set speeds is less than the value which can be predetermined and which is predetermined to be equal to or greater than zero. This changeover difference threshold value is selected such that the regulation stabilizes in an optimum manner with the selected control parameters when driving on level ground, that is to say the actual speed approaches the set speed as quickly and as uniformly as possible, without any noticeable control oscillations. On the other hand, when driving on a gradient, there is a risk that this control parameter matching to driving on level ground will lead to a noticeably worse transient response, with considerable overshoots, owing to the excess acceleration resulting from the gradient, since the control parameters are not optimized for this driving situation.

A method for controlling and limiting the speed of a motor vehicle is known from DE 195 47 716 A1. The changeover from acceleration regulation to speed regulation is carried out when the difference between the set speed and the actual speed falls below a specific value. During this changeover, when driving up hills, an adaptation value is produced which is dependent on the load acting on the motor vehicle and is applied as an additional element to the output signal of the speed regulator. This measure is intended to suppress interruptions in the control response when driving up hills. For routes with a significant downward gradient, it is impossible to reliably prevent significant regulation overshoots using this method.

DE 692 08 092 T2 describes a system for speed regulation with variable gain as a function of the speed error. Regulator coefficients are read from a memory depending on how the motor vehicle is being operated. No changeover between an acceleration regulator and a speed regulator is envisaged in this case.

The invention is based on the technical problem of providing a cruise control method of the type mentioned initially, which allows the regulation to have comparably good transient response, without any significant overshoots in the same way as when driving on level ground when driving on routes with noticeable roadway gradients, in particular routes with a noticeable downward gradient.

SUMMARY OF THE INVENTION

The invention solves the problem by providing a cruise control method wherein changing from acceleration regulation to speed regulation, the actual value of a roadway gradient characteristic is determined, that is to say a characteristic which is a measure of the instantaneous roadway gradient. The speed control parameter set used for subsequent speed regulation is then selected appropriately, matched to the roadway gradient, as a function of the determined actual value of the roadway gradient characteristic, from a plurality of speed control parameters sets which are predetermined differently for different possible values of the roadway gradient characteristic. For example, the normal standard speed parameter set, which is optimum for this purpose, can be used when driving on level ground, while a speed control parameter set which differs from this and is better matched to the existing negative roadway gradient value can be used when driving down a gradient, and this latter parameter set then leads to the same optimum transient response for this driving situation as the standard speed control parameter set does when driving on level ground.

In another aspect of the invention, the acceleration difference between the actual acceleration and a normal acceleration value which can be predetermined is used as the roadway gradient characteristic. The normal acceleration value in this case represents that acceleration value which the cruise control reaches when driving on level ground in the situation when the regulation has an optimum transient response, at the time of the changeover from acceleration regulation to speed regulation. In a further refinement of this method, the normal acceleration value is predetermined variably as a function of the actual speed and a selected transmission gear, for example being determined from characteristics that are dependent on the gear, using the actual speed. The control parameter set used for the initiated speed regulation is then preferably likewise defined on the basis of characteristics which are dependent on the gear, taking account of the determined acceleration difference between the actual acceleration at the changeover time and the normal acceleration value.

In yet another aspect of the invention, the speed control parameter set selected for subsequent speed regulation on changing over from acceleration regulation to speed regulation is maintained for a time period which can be predetermined, after which a smooth change is then made to the standard speed control parameter set, that is to say without any discontinuities in the speed regulator output signal.

BRIEF DESCRIPTION OF THE DRAWINGS

One advantageous embodiment of the invention is described in the following text and is illustrated in the drawings, in which.

DETAILED DESCRIPTION

Figure 1:
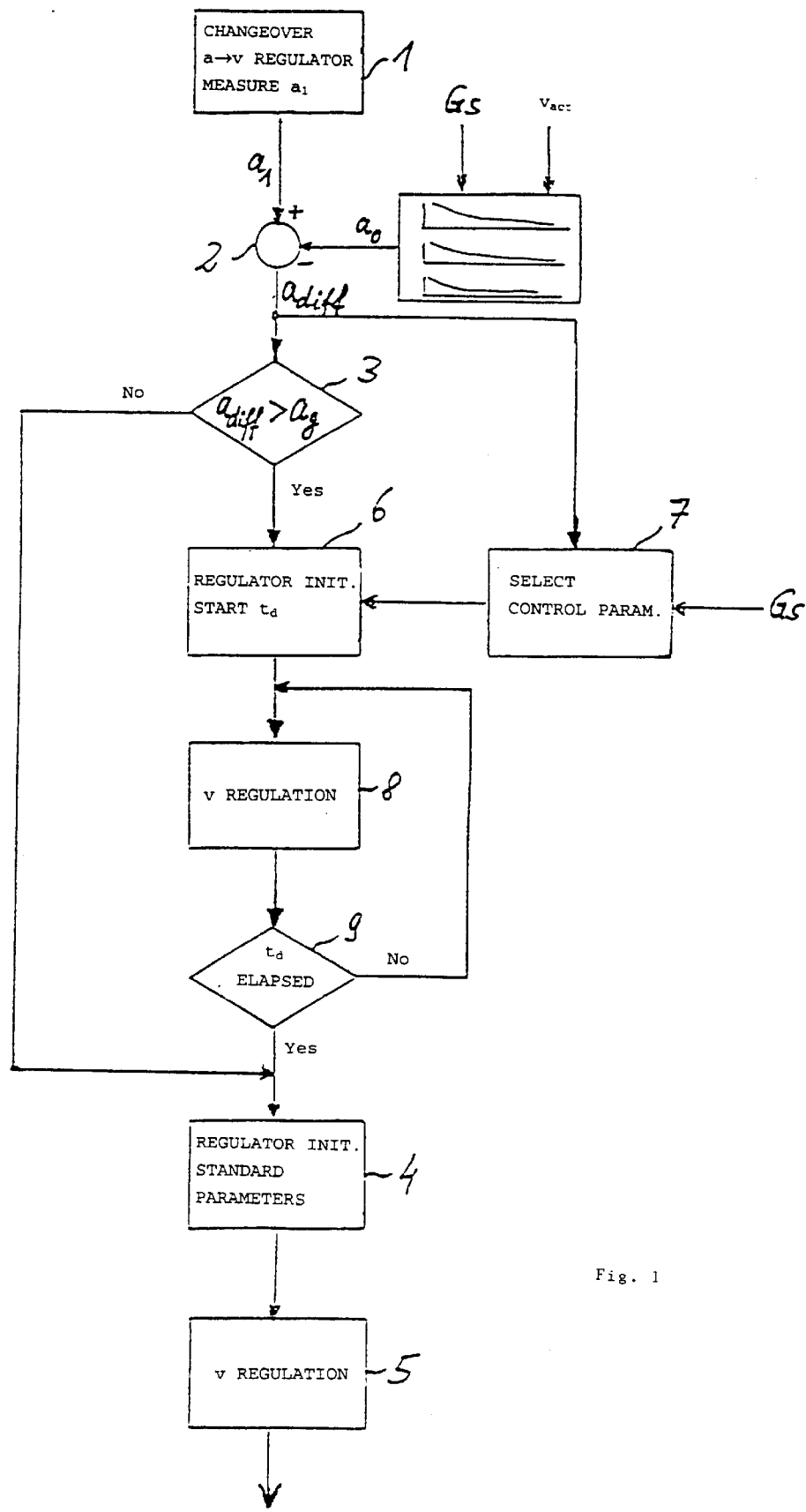
FIG. 1 shows a flow chart of a part of a cruise control method relating to the changeover from an acceleration regulation phase to a subsequent speed regulation phase.

FIG. 1 shows the part of a cruise control method that is of interest here, as is suitable, in particular, for cars. The cruise control method includes the implementation of acceleration regulation phases, in the conventional manner, as long as the actual speed is outside a speed regulation interval that includes the set speed, that is to say is further away from the set speed by an amount which can be predetermined and is greater than zero, as well as speed regulation phases as long as the actual speed is within the speed regulation interval.

During the acceleration regulation phases, the actual acceleration is regulated at a set acceleration, which is selected such that the actual speed is varied rapidly in the direction of the set speed. Depending on the application, the set acceleration may be changed variably as a function of specific influencing variables during an acceleration regulation phase, for example as a function of the difference between the actual speed and set speed, in such a manner that the set acceleration is reduced as the interval between the actual speed and the set speed becomes less. Once the actual speed has reached the predetermined speed regulation interval, that is to say the interval between the actual speed and set speed is less than the predetermined interval threshold value, the system changes over from acceleration regulation to a subsequent speed regulation phase, in which the actual speed is regulated at the set speed.

In order to improve the transient response of the cruise control, speed control parameter sets are now provided which differ as a function of the roadway gradient and from which that set is selected for the subsequent speed regulation phase which corresponds best to the roadway gradient existing at that time. In particular, different parameter sets are selected for driving down gradients than for driving on level ground, for which a conventional standard speed parameter set is used. It is obvious that the respectively used speed parameter set is also defined as a function of the actual speed and of the gear selection in a transmission system, for which purpose appropriate characteristics for the control parameters are predetermined, in a manner known per se, as a function of the two influencing variables, actual speed and gear. The actual speed and the selected gear are for this purpose detected by sensors while driving, as is familiar to a person skilled in the art.

In order to carry out this method, which leads to an improved transient response after changing over from acceleration to speed regulation, particularly when driving down gradients, it is possible to use one of the regulating devices known from the prior art cited initially, which does not require any more detailed explanation here. In particular, such a regulating device for carrying out the method may include a speed regulator and an acceleration regulator in parallel with it, between which the system switches over automatically, so that either the speed control loop or the acceleration control loop is active.

The characteristic procedure following the changeover from acceleration regulation to speed regulation, as can be seen in FIG. 1, includes, in a first step 1, a measurement of the actual acceleration $a_1$ at the changeover time, in addition to changing over from the acceleration regulator to the speed regulator. In a subsequent step 2, the acceleration difference $a_{diff} = a_1 - a_0$ between the measured actual acceleration $a_1$ and a normal acceleration value $a_0$ is calculated, this being determined from predetermined characteristics as a function of the actual speed $v_{act}$ and the selected transmission system gear Gs. These characteristics are defined such that the normal acceleration value $a_0$ obtained from them corresponds to that acceleration value which should be used when driving on level ground in order to achieve an optimum regulation transient response at the time of the changeover from acceleration regulation to speed regulation. The calculated acceleration difference $a_{diff}$ thus has the value zero when driving on level ground or, if there is a slight acceleration regulation error at the changeover time, a value which only ever differs from this slightly. If, on the other hand, the vehicle is being driven down a gradient, the calculated acceleration difference $a_{diff}$ increases as the negative roadway gradient increases, since the vehicle accelerates automatically without any drive torque, and the actual acceleration thus differs increasingly from the normal acceleration value related to driving on level ground. The calculated acceleration difference $a_{diff}$ thus represents a roadway gradient characteristic which is a useable measure of the instantaneous negative roadway gradient. Alternatively, the roadway gradient may, of course, be detected in some other way, for example by means of an appropriate inclination sensor in the vehicle.

Question step 3 is then used to find out whether the calculated acceleration difference $a_{diff}$ is greater than a predetermined difference threshold value $a_g$, which is equal to zero or is fixed at a value slightly greater than zero as a safety margin with regard to minor measurement or calculation inaccuracies. If this is not the case, then it is deduced that the vehicle is not driving down a gradient and a standard speed control parameter set is then selected, in the next step 4, for initialization of the speed regulator for the subsequent speed regulation. The speed regulator then uses this parameter set in step 5 during the speed regulation phase to calculate a control signal by means of which the actual speed is regulated at the predetermined set speed, with the standard speed control parameter set being maintained throughout the entire duration of the speed regulation phase, until the cruise control is deactivated.

If, on the other hand, it is found in the above question step 3 that the acceleration difference $a_{diff}$ is greater than the difference threshold value $a_g$, then this is used to deduce that the vehicle is driving down a gradient. In this case, in a next step 6, the speed regulator is initialized with a speed control parameter set which is best matched to this situation and which is selected in an associated step 7, from a plurality of previously stored parameter sets, as a function of the selected transmission gear Gs and the calculated acceleration difference $a_{diff}$. These gradient-specific speed control parameter sets may in this case be stored in the form of corresponding characteristics which define those control parameters used for the speed regulator, as a function of the transmission gear and of the acceleration difference $a_{diff}$ which indicates how steep the gradient is.

A timer for counting down a predetermined time period td is started at the same time as the initialization of the speed regulator with the speed control parameter set matched to the gradient. The speed regulation phase then starts by activation of the speed regulator with the selected speed control parameter set matched to the gradient (step 8). In this case, a question step 9 is used to check continually whether the time period td counted down by the timer since the start of the speed regulation phase has elapsed. As long as this is not the case, the speed regulator continues speed regulation with the selected speed control parameter set matched to the gradient. If, on the other hand, the predetermined time period td has elapsed, a smooth change is made from the previous control parameter set matched to the gradient to the standard speed control parameter set, for which purpose the speed regulator is appropriately reinitialized. From then on, the speed regulator carries out speed regulation on the basis of the standard speed parameter set. In consequence, the time period td determines the duration of the initial speed regulation phase with the selected speed control parameter set matched to the gradient and is suitably predetermined for this purpose, in such a manner that the speed regulator can smoothly reduce the excess acceleration resulting from the gradient during this time so that it is then, subsequently, possible to change smoothly to speed regulation with the normal standard control parameter set.

Figure 2:
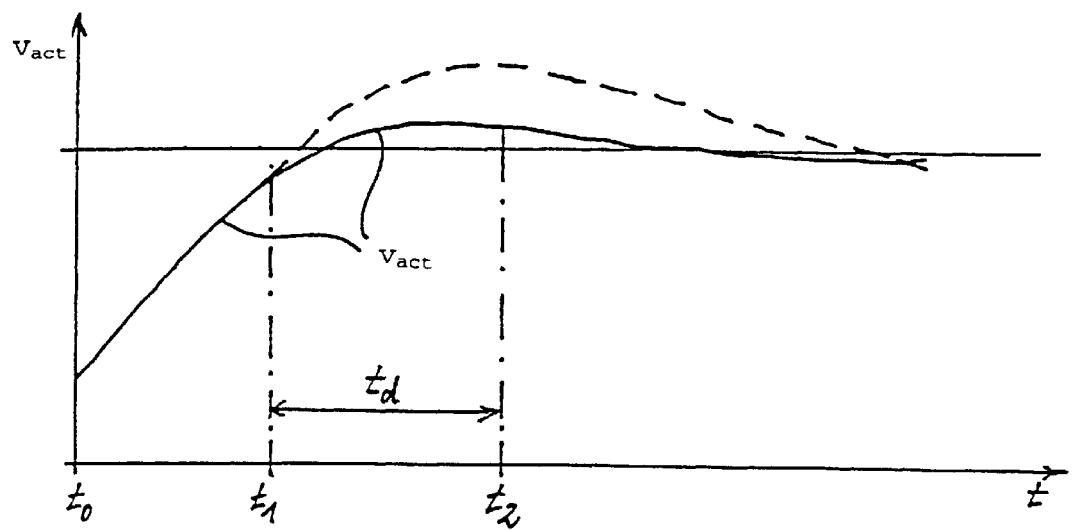
FIG. 2 shows two diagrams, synchronized in time, of examples of profiles of the driving speed and engine torque for an example of a driving example according to the method in FIG. 1, compared with a conventional method.
Figure 2:
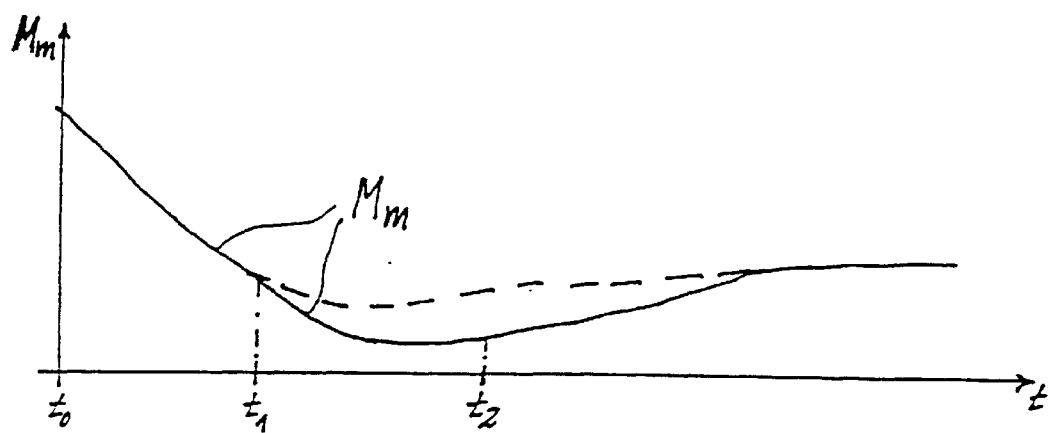

In the diagrams in FIG. 2, the method of operation of the method shown in FIG. 1 is illustrated by way of example in diagrammatic form, with the upper diagram showing the actual speed $v_{act}$ as a function of the time t, and the lower diagram, synchronized to this in time, showing the time profile of the engine torque $M_m$.

At the time of origin $t_0$ of the diagrams in FIG. 2, the cruise control is in an acceleration regulation phase, since the actual speed $v_{act}$ is below a speed regulation interval for speed regulation phases, whose lower interval limit value $v_{set}-v_G$ is below the desired set speed $v_{set}$ by a predetermined interval value $V_G$. The acceleration regulation phase results in the actual speed $v_{act}$ being increased smoothly in the direction of the set speed $v_{set}$. At a time $t_1$, the actual speed $v_{act}$ reaches the lower interval limit value $v_{set}-v_G$ of the speed regulation interval, as a result of which the cruise control changes over from the previous acceleration regulation phase to a speed regulation phase.

Let us now consider the situation where the vehicle is currently driving down a gradient. If the standard speed control parameter set mentioned above and optimized for driving on level ground were now used immediately for the onset of the speed regulation phase, this would result in the further profile indicated by dashed lines in qualitative terms for the actual speed $v_{act}$ and which, as can be seen, has a considerable overshoot in the actual speed $v_{act}$ above the set speed $v_{set}$. Since, however, the speed control parameter set which has been selected appropriately for the gradient severity and is matched to that gradient is used initially, according to the invention, this results in the actual speed $v_{act}$ approaching the set speed $v_{set}$ in an improved, quicker manner, with considerably reduced overshooting, as shown by the solid line. After the predetermined time period td, the system then switches at an appropriate time $t_2=t_1+t_d$ the speed regulator from the speed control parameter set matched to the gradient to the standard speed control parameter set, using which the actual speed vast is then regulated at the set speed $v_{set}$ from then on.

The lower diagram in FIG. 2 shows the influence of the speed control parameter set which is specific to the gradient and is used at the start of the speed regulation phase, on the engine torque $M_m$, as is shown by the solid line, in comparison with conventional, immediate use of the standard speed control parameter set. By initially using the selected speed control parameter set matched to the gradient, the engine torque $M_m$, which is reduced as early as the end of the acceleration regulation phase as the actual speed $v_{act}$ approaches the set speed $v_{set}$, is even more greatly reduced by the speed regulation that starts at the time $t_1$ than with the conventional, immediate use of the standard speed control parameter set, whose influence on the engine torque is indicated by a dashed line, for comparison. This greater reduction in engine torque by the speed control parameter set matched to the gradient compensates for the excess acceleration, resulting from the gradient, when changing over from acceleration regulation to speed regulation. After changing from the speed control parameter set matched to the gradient to the standard speed control parameter set at the time $t_2$, the engine torque $M_m$ then gradually rises to a value which is appropriate for further speed regulation using the standard speed control parameter set. The time period $t_d$ in which the speed regulator uses the control parameter set matched to the gradient, is expediently selected such that the speed regulator has reduced the engine torque in a continuous manner by the time $t_2$ of the changeover to the standard speed control parameter set, to such an extent that the excess acceleration resulting from the gradient is at least very largely dissipated, so that the changeover to the standard speed control parameter set can be carried out smoothly, without any disturbing acceleration jerking effects.

The exemplary embodiment considered above makes it clear that the cruise control method according to the invention allows a particularly smooth changeover, without any jerking, from an initial acceleration regulation phase, in which the actual speed is still a relatively long way away from the set speed, to a subsequent speed regulation phase, in which the actual speed is regulated at the set speed, irrespective of the roadway gradient and with constant quality so that, particularly when driving down gradients, no significantly more severe transient processes occur than when driving on level ground.

What is claimed is:

1. A cruise control method for controlling an actual speed of a motor vehicle to a set speed, a speed regulation interval being a range of actual speeds including the set speed during which the actual speed is controlled by speed regulation, the actual speed being controlled by acceleration regulation so long as the actual speed is outside the speed regulation interval, the method comprising the steps of:

(1) when the actual speed ($v_{act}$) transitions into the speed regulation interval such that control of the actual speed changes from acceleration regulation to speed regulation;

determining an actual value of a roadway gradient characteristic ($a_{diff}$); and (2) selecting a speed control parameter set as a function of the roadway gradient characteristic actual value, the speed control parameter set being selected from a plurality of speed control parameter sets which are predetermined differently for different possible roadway gradient characteristic values and are specific for the roadway gradient.

2. The method according to claim 1, further characterized in that an acceleration difference ($a_{diff}$) between an actual acceleration ($a_{act}$) and a normal acceleration value ($a_0$) is used as the roadway gradient characteristic.

3. The method according to claim 2, further characterized in that the normal acceleration value ($a_0$) is predetermined variably as a function of the actual speed ($v_{act}$) and a selected gear (Gs) in which the motor vehicle is operating when the actual speed ($v_{act}$) transitions into the speed regulation interval.

4. The method according to claim 1 further comprising continuing to use the selected speed control parameter set for a predetermined time period (td); and subsequently using a standard speed control parameter set.

5. A cruise control method for controlling an actual speed of a motor vehicle to a set speed, a speed regulation interval being defined as a range of actual speeds that include the set speed, while the actual speed is within the speed regulation interval the actual speed is controlled by speed regulation, the method comprising the steps of:

controlling the actual speed by acceleration regulation so long as the actual speed is outside the speed regulation interval;

when the actual speed ($v_{act}$) transitions into the speed regulation interval, changing from acceleration regulation of the actual speed to speed regulation of the actual speed;

determining an actual value of a roadway gradient characteristic ($a_{diff}$); and selecting a speed control parameter set as a function of the roadway gradient characteristic actual value, the speed control parameter set being selected from a plurality of speed control parameter sets which are predetermined differently for different possible roadway gradient characteristic values.

6. The method according to claim 5, further characterized in that an acceleration difference ($a_{diff}$) between an actual acceleration ($a_{act}$) and a predetermined normal acceleration value ($a_0$) is used as the roadway gradient characteristic.

7. The method according to claim 6, further characterized in that the predetermined normal acceleration value ($a_0$) is predetermined variably as a function of the actual speed ($v_{act}$) and a selected gear (Gs) in which the motor vehicle is operating when the actual speed ($v_{act}$) transitions into the speed regulation interval.

8. The method according to claim 5 further comprises continuing to use the selected speed control parameter set for a predetermined time period (td); and subsequently using a standard speed control parameter set.

9. A cruise control method for controlling an actual speed of a motor vehicle to a set speed, the actual speed being controlled by acceleration regulation so long as the actual speed is outside a speed regulation interval, the speed regulation interval including a range of actual speeds that include the set speed, the method comprising the steps of:

when the actual speed ($v_{act}$) transitions into the speed regulation interval such that control of the actual speed changes from acceleration regulation to speed regulation, determining an actual value of a roadway gradient characteristic ($a_{diff}$);

determining a gear in which the vehicle is operating; and selecting a speed control parameter set as a function of the roadway gradient characteristic actual value and the gear, the speed control parameter set being selected from a plurality of speed control parameter sets which are predetermined differently for different possible roadway gradient characteristic values and vehicle gears.

10. The method according to claim 9, further characterized in that an acceleration difference ($a_{diff}$) between an actual acceleration ($a_{act}$) and a predetermined normal acceleration value ($a_0$) is used as the roadway gradient characteristic.

11. The method according to claim 9 further comprising the step of continuing to use the selected speed control parameter set for a predetermined time period (td); and subsequently using a standard speed control parameter set.

* * * * *